3,268,019
WEIGHING SCALE
Woodson C. Deeds, 5409 Morella Ave.,
North Hollywood, Calif.
Filed June 14, 1965, Ser. No. 463,504
3 Claims. (Cl. 177—136)

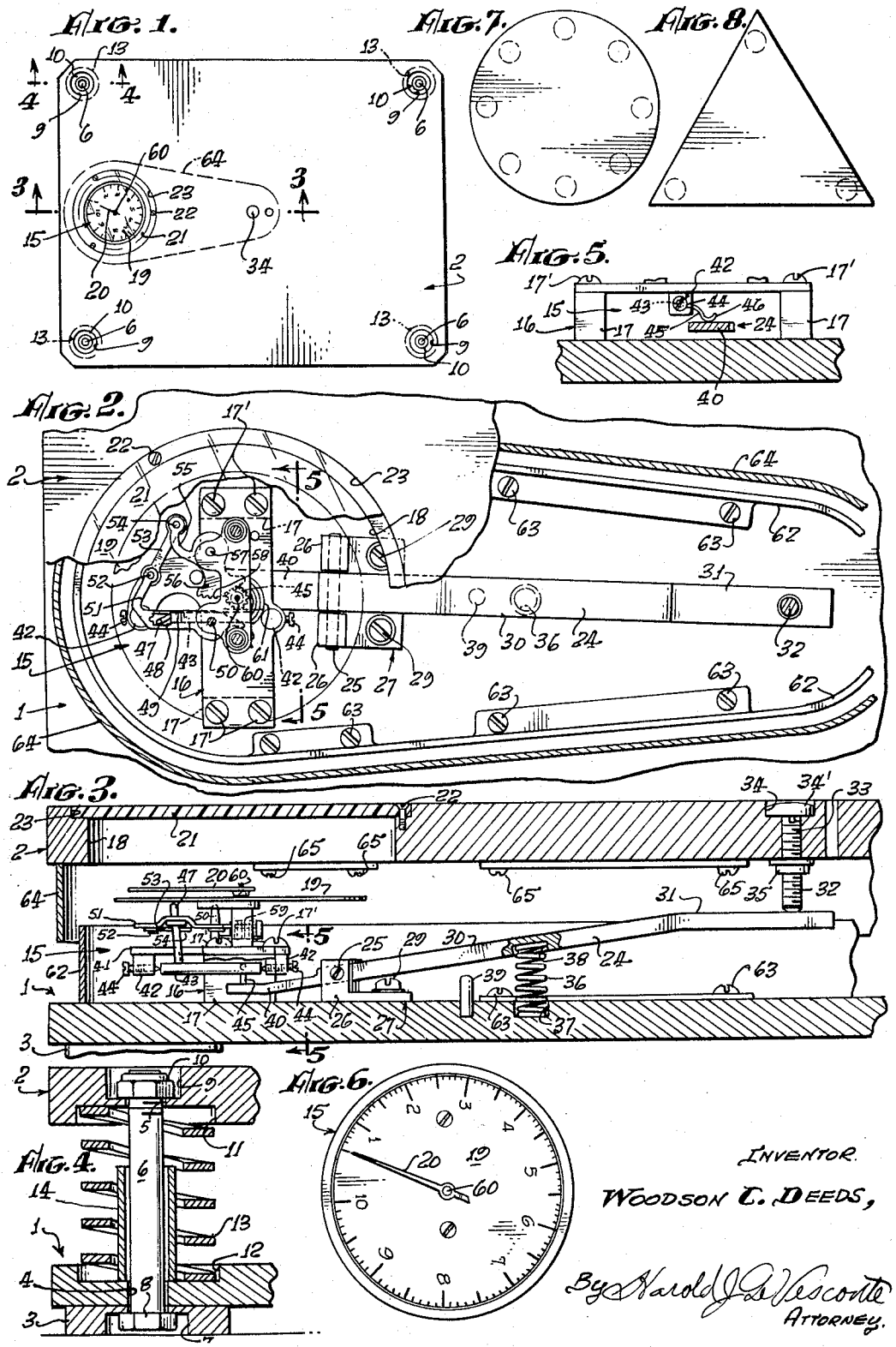

This application is a continuation-in-part of my copending application, Serial No. 338,280, filed January 6, 1964 and relates, as does my said co-pending application to a weighing scale of high but accurate capacity while maintaining a low profile dimension, of small size and of unusually light weight for the load capacity for which it is intended. It relates particularly to improvements in weighing scales for determining the weights of vehicles wherever the vehicles may be desired to be weighed as compared with other scales permanently installed and to which the vehicle must be brought.

Prior art scale devices for comparable use if readily portable are not sufficiently accurate for most uses or if of the permanently installed type to which the vehicles are brought are very expensive, both in initial cost and in installation. Moreover, the prior art portable scale devices for heavy vehicular loads such as trucks or aircraft normally are inaccurate but also are not readily adapted for quick use. Portability, accuracy and quick setup and use is especially desirable in two fields (a) in the accurate determination of the load carried by each wheel of a car in automobile racing and (b) in the detection of overloads and trucks in traffic control and enforcement.

The present invention comprehends a weighing device particularly adaptable to the above mentioned fields in that it offers an average accuracy of plus or minus 1% (which is well within usually encountered commercial tolerance requirements) coupled with a low initial cost, a low silhoutte and the previously mentioned lightness in weight.

Another objective of the invention is to provide a scale in which the foregoing advantages and objectives are realized and which is additionaly constructed so that it may be used on an uneven surface without loss of the accuracy thereof.

Still other objectives of the invention are to provide a scale in which the foregoing objectives and advantages are realized in practice and which, additionally, is not adversely affected by a considerable degree of offcenter loading, which is simple and easy to calibrate accurately and which possesses positive means to prevent damage deriving from accidental or unintended overloading.

With the foregoing objects in view together with such additional objects and advantages as may subsequently appear, the invention resides in the parts and in the construction, combination and arrangement of parts described, by way of example, in the following specification of certain presently preferred embodiments of the invention, reference being had to the accompanying drawings which form a part of said specification and in which drawings:

FIG. 1 is a top plan view of one presently preferred embodiment of the invention, FIG. 2 is a greatly enlarged, fragmentary, top plan view with certain portions of the platform and weight indicating means broken away to show interior construction, FIG. 3 is a fragmentary sectional view on the same scale as FIG. 2 and taken on the line 3—3 of FIG. 1, FIG. 4 is an enlarged fragmentary section on the line 4—4 of FIG. 1 showing in cross section the construction associated with each of the load supporting springs, FIG. 5 is a fragmentary section taken on the line 5—5 of FIGS. 2 and 3, FIG. 6 is a plan view of the weight indicating dial and the associated needle or pointer, and FIGS. 7 and 8 are plan views showing other plan configurations of the scale mechanism.

Referring first to FIGS. 1 through 6, the first illustrated embodiment of the invention comprises a pair of heavy metal plates of identical rectangular plan configuration and comprising a base plate 1 and a load carrying plate 2. At the corners thereof the under face of the base plate is provided with foot members 3 and bores 4 extending one each through each foot portion and the base plate. The load carrying plate 2 is likewise provided with corresponding bores 5. Bolt 6 extends through the aligned bores at each corner of the plates as shown in FIG. 4. As here shown the foot members are provided with counterbores 7 for the heads of the bolts 8 and at its upper surface, the corners of the plate 2 are provided with counterbores 9 housing the nuts 10 on the bolts. The under face of the load carrying plate is provided with counterbores 11 which are coaxial with the holes 5 and the upper face of the base plate 1 is provided with complementary counterbores 12. Seated in the opposing counterbores at each corner of the plate are the opposite ends of compression springs 13 which are of identical length and which operate to hold the upper load carrying plate spaced from the bottom or base plate. Each of the bolts 6 also carries a loosely fitting sleeve 14 of less length than the associated spring 13 and said sleeves serve to limit the extent to which the springs 13 may be compressed by an imposed load so that the springs may not be depressed to a point which would impart a permanent set thereto and to limit the permissible extent of downward movement of the springs to an amount which would not be deleterious to the load indicating means presently to be described. Preferably, at least the bottom plate is sufficiently resilient so that in response to the loads imposed thereon through the compression of the springs 13, it can yield slightly to accommodate any unevenness in the surface on which it may rest. Generally, so-called die springs have been found to be satisfactory when, as will be presently explained, the springs are first checked to insure that matching sets of four springs each are employed in individual scales. As a load is imposed on the plate 2 sufficiently to compress the springs 13, the movement of the plate 2 toward the base plate 1 is, in effect, measured to indicate the imposed weight.

Disposed adjacent one end thereof and in the longitudinal center line thereof the upper surface of the base plate carries an indicating mechanism generally indicated at 15, said mechanism being supported on a base 16 which is secured to the upper end of laterally spaced upstanding lugs 17, 17 by screws 17', said base extending transversely of the said longitudinal center line of the base plate. An opening 18 in the top plate 2 affords means for observation of the indicating mechanism dial 19 and needle 20, said opening preferably being closed by a transparent glass or plastic cover 21 secured by screws 22 in a recess 23 surrounding the opening 18.

The weight responsive movement of the indicating means derives from downward movement of the plate 2 by weight imposed thereon in opposition to the springs 13 and the means for transmitting this movement to the indicating means comprises motion reducing means including a lever 24 pivotally mounted adjacent a shorter end thereof which engages an instrumentality of the indicating means, the said pivotal mounting comprising a horizontal pivot pin 25 extending through the lever and carried at each side of the lever in ear elements 26, 26 formed as an integral part of a bracket 27 secured to the upper face of the plate 2 and said lever being disposed in the vertical plane containing the longitudinal center line of the plates and said bracket being secured to the base plate by screws 29, 29.

From its said pivot point, the longer end of the lever 24 extends away from the indicating means in an upwardly inclined run 30 to a relatively horizontal distal end 31 which under the unloaded condition of the scale is substantially parallel to and spaced beneath the load carrying plate 2. The load carrying plate 2 carries a screw stud 32 threaded into a hole 33 extending therethrough with the upper end of said hole terminating in a counterbore 34 normally closed by a cap 34'. A nut 35 engages the screw on the under side of the plate and the screw projects beyond the nut 36 to engage the end portion 31 of the lever while permitting lateral movement of the load carrying plate in all directions to the extent permitted by the compression springs 13. Beneath the lever, a light compression spring 36 having its opposite ends seated in sockets 37 and 38 formed respectively in the top of the base plate 1 and the under side of the lever 26 serves to maintain the lever in contact with the screw 32 and a stop pin 39 serves to limit the extent of load responsive movement of the lever to an extent which will not be injurious to the indicating mechanism. The opposite end 40 of the lever 24 extends beneath the indicating means base member 16 and is engaged by a follower member of the indicating mechanism now to be described. It is particularly to be noted that any relative lateral movement of the load carrying plate will not communicate any stress to the lever 24 or any mechanism actuated by the lever.

The indicating mechanism includes a frame structure 41 on which the various moving parts thereof are mounted. Laterally spaced outwardly from and parallel to a vertical plane containing the side edge of the lever end portion 40, the frame structure 41 carries spaced depending lug portions 42, 42 on which a rocker arm 43 is mounted for oscillation on needle point bearings formed by screws 44, 44 extending through said lugs. Adjacent one end thereof, the rocker arm 43 carries a horizontally extending arm 45 which projects above the lever portion 40 and is provided with a U-shaped bend 46 adjacent the distal end thereof which presents a rounded face contacting the upper surface of the said lever portion. Adjacent its other end, the rocker arm 43 carries a vertically extending arm 47 which extends upwardly therefrom through a slot 48 which extends to the midlength portion of a lever arm 49 having one end thereof pivoted at 50 on the frame structure 41 for movement about a vertical axis and having the opposite end thereof bent laterally in a run 51 and pivotally connected at 52 to one end of a link 53, the other end of which is pivotally connected at 54 to a curved arm portion 55 of a segmental gear member 56 which is pivoted on the frame structure 41 at 57 and includes a tooth portion 58 which meshes with a gear 59 on the shaft 60 which shaft carries the indicating needle 20. A preloaded spiral spring 61 reacts between the frame structure 41 and the shaft 60 tending constantly to yieldingly urge the shaft in a counterclockwise direction as viewed in FIGS. 1, 2 and 6 to the limit imposed by engagement of the lever 24 with the screw 32 when the springs 13 have lifted the load carrying plate 2 to the limit imposed by the nuts 10 and bolt heads 8. This indicator mechanism is one which is obtained from a pressure responsive gauge available on the open market and modified so that the lever portion 40 is substituted for the pressure responsive element by which the mechanism was originally actuated and is otherwise unchanged except for the replacement of the original dial by a dial which is calibrated to be read in terms of weight and for certain adjustments in the configuration of the parts to be described.

The indicating mechanism and the operating lever therefor are protected by a shroud wall 62 secured to the upper face of the base plate 1 by screws 63 cooperating with a complementary, slightly larger shroud wall 64 depending from the under face of the top plate 2 and secured to said under face by screws 65, the spacing between said walls in all their directions being greater than any lateral play permitted between the plates 1 and 2.

Before beginning the description of the adjustments, it should be said that while any force responsive device which might in its original force or by modification to suit the nature of the input force may be employed in this invention, experience to date has indicated that devices with a non-linear response are probably best, especially where an accuracy factor of not greater than about 1% over the whole range of scale response is desirable. This non-linear response derives from the facts of the differences in the rates of different sets of load resisting springs and the changing angles in the relation between the various links and levers of the device. Die springs are standard articles of commerce and are made in certain standard sizes and approximate rates. Extreme uniformity in the rates thereof is not required for their intended use and springs of the same size of stock and overall dimensions will vary as much as 10% from any average rate and will be deemed satisfactory in die construction. In the present invention, however, the springs establishing a set of four for use in any one scale must be matched in size and individual rates within close tolerances and such tolerances may be more readily attained by selective assembly than by trying to manufacture the springs individually to a given rate. As will be presently apparent, the design of the present scale is such that so long as the individual springs of any one set are substantially uniform, adjustments may be made so that the scale will accurately respond to imposed loads over its entire range. Thus in the present invention each set of springs is matched in size and individual rates to close tolerances, it being more important that the springs match each other in rate rather than what that rate may be.

Assuming that for a given scale device, a matched set of die springs has been selected and installed, the load indicating device of the scale is then provided with a test dial and the screw 32 is adjusted to effect zero reading on the test dial. The scale is then subjected to a series of gradually increasing loads and the response thereof by the needle 19 on the test dial is noted. The test dial is identical in calibration to the dial to be finally used and differs only in that it has openings extending therethrough affording access to the levers and other elements of mechanism which may be in need of adjustment to achieve the response of the scale to the various imposed loads. The differences between the response to the loads and the calibrations on the test dial are noted and by changing the positions of the arcs described by the pivot points of the link 53 by bending one or both of the arms 47 and 51 or by bending the arms associated with the rocker arm member 43, a series of points are quickly found at which the needle accurately indicates the imposed loads on the non-linear graduations of the test dial. The test dial is then replaced by the dial to be used in the finished scale, the cover plate 21 is installed and the scale is ready for use.

The scale is not necessarily limited to a rectangular configuration and, for example, may either be circular as shown in FIG. 7 which, incidentally permits a greater number of load resisting springs to be employed or may be of any polygonal plan configuration as suggested by FIG. 1 or FIG. 7 which respectively show rectangular and triangular plan configurations. The circular form of the invention shown in FIG. 7 is particularly valuable for great loads such as a load of aircraft while a triangular configuration obviously affords a self-leveling characteristic. Particularly for vehicular use, the base and load carrying plates may conveniently be formed of suitable heavy aluminum alloy plate having properties affording both sufficient strength and sufficient resiliency to afford capacity for yielding accommodation to irregularity of the surface on which it rests without adversely affecting the accuracy of the scale.

While in the foregoing specification there has been described certain presently preferred embodiments of the invention, the invention is not to be deemed to be limited to the precise details of construction thus described by way of example and it will be understood that the invention includes as well all such changes and combinations in the parts and in the construction, combination and arrangement of parts as shall come within the purview of the appended claims.

I claim:
1. In a low silhouette weighing scale for determining a load imposed by the wheel of a vehicle on a road surface, a base plate adapted to rest on a vehicle supporting road surface, a load carrying plate disposed in spaced parallel relation above said base plate, a plurality of compression springs of substantially uniform length and rate having the opposite ends thereof disposed in opposed pairs of sockets formed in adjacent faces of said plates along the perimeter of said base plate, said springs being operative to yieldingly resist the load of at least a portion of a vehicle imposed by a wheel thereof disposed on said load carrying plate, means associated with each of said springs constantly operative both to limit the permissible extent of movement of said load carrying plate toward and away from said base plate and to secure the associated spring in its respective pair of sockets, spring biased indicating devices carried by said base operative to translate load responsive movement of said load carrying plate toward said base plate in visually determined expression of imposed load, means for actuating said indicating devices in opposition to the spring bias thereof while permitting relative lateral movement of said load carrying plate while maintaining the operative integrity of the indicating devices, said actuating means comprising motion reducing means carried by said base plate and engaging said load carrying plate and said indicating devices and telescopically disposed wall elements carried by the adjacent faces of said plates and substantially surrounding said indicating devices and said motion reducing means.

2. A weighing scale as claimed in claim 1 in which said means associated with each of said springs for limiting movement of said load carrying plate away from said base plate serves additionally as the mounting means for other means operative to limit movement of said load carrying plate toward said base plate.

3. A weighing scale as claimed in claim 1 in which said motion reducing means comprises a lever pivotally mounted between the ends thereof on said base plate for movement about a pivot extending normal to load responsive movement of said load carrying plate and disposed between the ends of said lever and including a longer end yieldingly maintained in engagement with an abutment on said load carrying plate and a shorter end in engagement with an actuating component of said indicating devices, and in which said base plate carries abutment means operative to prevent movement of said lever to an extent harmful to said indicating devices.

References Cited by the Examiner

UNITED STATES PATENTS

| 1,928,065 | 9/1933 | Litle | 177—234 |
| 2,867,432 | 1/1959 | Barker et al. | 177—141 |

FOREIGN PATENTS

| 509,325 | 1/1955 | Italy. |
| 545,632 | 7/1956 | Italy. |
| 605,481 | 6/1960 | Italy. |

RICHARD B. WILKINSON, *Primary Examiner.*

S. J. TOMSKY, *Assistant Examiner.*